United States Patent [19]
Newby

[11] Patent Number: 5,855,463
[45] Date of Patent: Jan. 5, 1999

[54] BOLT AND NUT THREAD FRICTION LOCKING DEVICE WITH OPPOSITE HAND THREADS WITH A CAPTURED SPRING OR SPRING LOCK WASHER

[76] Inventor: John C. Newby, P.O. Box 989, Cobb, Calif. 95426

[21] Appl. No.: 929,684

[22] Filed: Sep. 15, 1997

[51] Int. Cl.⁶ ........................................ F16B 39/16
[52] U.S. Cl. .................. 411/244; 411/929.1; 411/932
[58] Field of Search ................................. 411/222, 223, 411/229, 231, 243, 244, 262, 263, 289, 312, 318, 432, 910, 929.1, 931, 932

[56] References Cited

U.S. PATENT DOCUMENTS

| | | |
|---|---|---|
| 257,854 | 5/1882 | Dillon . |
| 453,660 | 6/1891 | Reynard . |
| 611,847 | 10/1898 | Smith . |
| 628,732 | 7/1899 | Wing . |
| 755,146 | 3/1904 | Linsley . |
| 796,900 | 8/1905 | Cull . |
| 876,081 | 1/1908 | Orr . |
| 898,432 | 9/1908 | Boyle . |
| 982,947 | 1/1911 | Greer . |
| 1,321,270 | 11/1919 | Wrayge . |
| 1,357,331 | 11/1920 | Fauve . |
| 1,399,191 | 12/1921 | Casali . |
| 1,488,069 | 3/1924 | Seago . |
| 1,499,039 | 6/1924 | Udart . |
| 2,587,560 | 2/1952 | Widmer . |
| 4,027,572 | 6/1977 | Burge ........................................ 85/32 R |
| 4,569,259 | 2/1986 | Rubin . |
| 4,909,689 | 3/1990 | Komatsu . |
| 5,232,249 | 8/1993 | Kolvereid . |
| 5,256,014 | 10/1993 | Wing . |
| 5,439,337 | 8/1995 | Kakimoto . |
| 5,544,991 | 8/1996 | Richardson . |
| 5,622,465 | 4/1997 | Junkers . |
| 5,634,753 | 6/1997 | Goellner . |

Primary Examiner—Steven Meyers
Assistant Examiner—Gary Estremsky

[57] ABSTRACT

A friction thread locking device assembly consisting of several components, which are so constructed and assemble to resist the rotational effects of vibration forces. The resistance is achieved by the use and placement of opposing threads (right and left hand threads) with differing threads per inch and the containment of a compressed spring force and the use of the clearance between matching female and male threads. This bolt and nut assembly by unique construction, combines and improves the aspects of the standard bolt and nut with a spring lock washer. The outer nut and inner nut matching threads are axially aligned and the two are threaded together in opposite directions to compresses the captured spring(s) or lock washer(s). This preloaded, three part assembly with matching inner female threads on both the outer nut and inner nut are axially aligned with each other is then rotated onto the threaded rod with matching male threads. Once in place the outer nut and inner nut are rotated in the opposite direction from each other, which transfers the preload to the male threaded shaft threads. This is due to the clearance between the two sets of male and female threads and to the threads per inch difference between the two sets. The inner nut and outer nut of the assembly can only be rotated in an opposite direction until they meet the resisting force of the opposite hand thread interaction. The assembly is now in a load condition whereas to loosen itself from the rod threads it must tighten itself against and overcome the spring force of the spring lock washer(s) or spring(s).

4 Claims, 3 Drawing Sheets

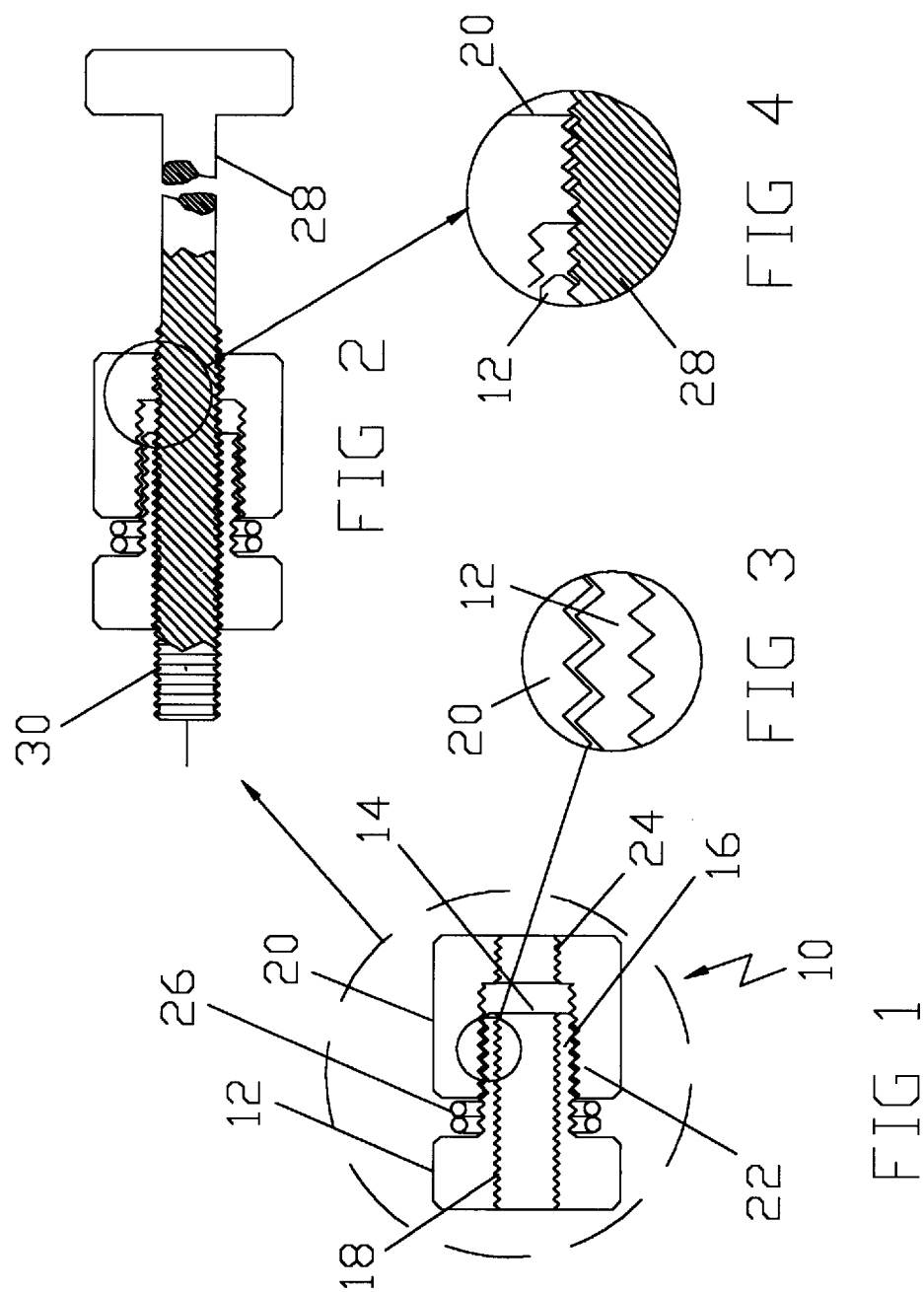

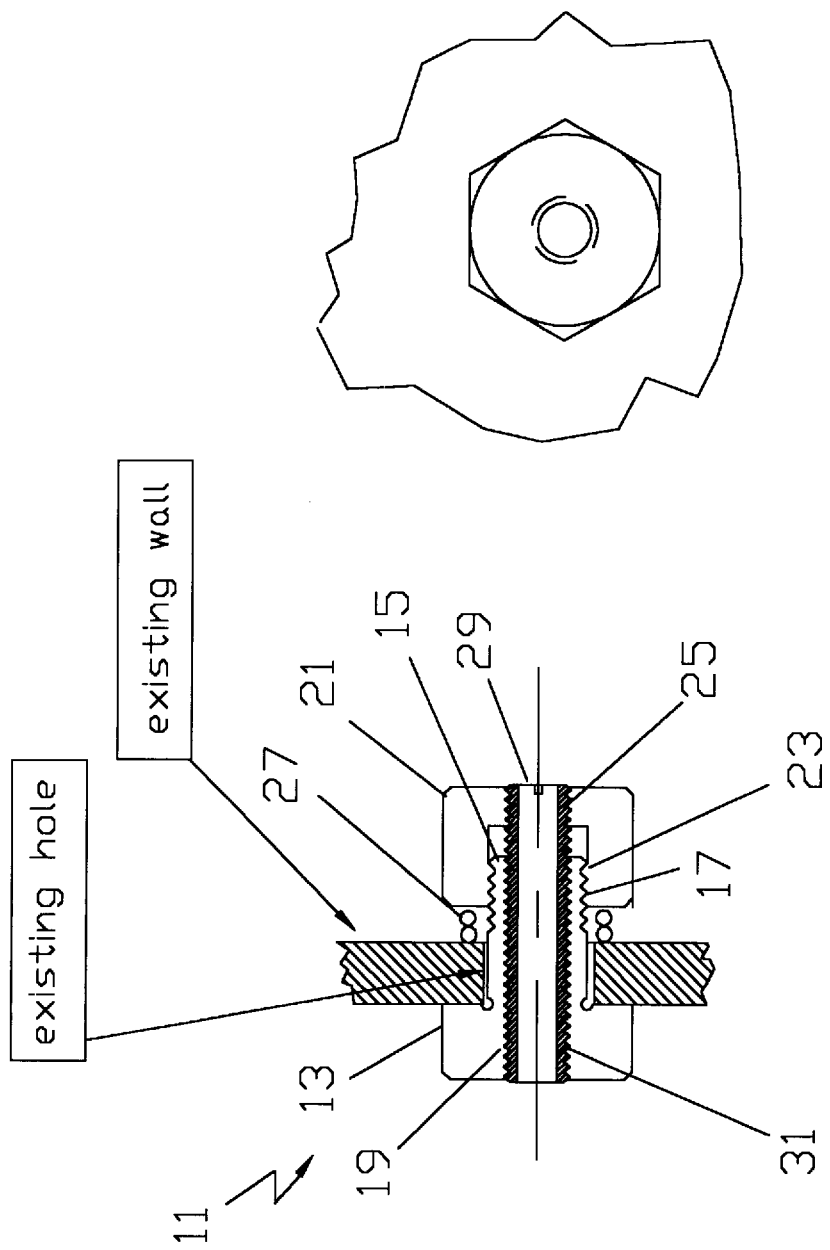

BOLT AND NUT THREAD FRICTION LOCKING DEVICE WITH OPPOSITE HAND THREADS WITH A CAPTURED SPRING OR SPRING LOCK WASHER

FIELD OF THE INVENTION

This invention relates generally to a thread locking device and more particularly to a bolt shaft or rod shaft and a two nut friction locking device. The common female threads of both nuts to mate with the same bolt shaft or rod threads. Each of the nuts is to be machined with a second thread. One of the nuts is to be machined with male threads, the other nut to be machined with mating female threads. These threads are to be opposite hand to those machined on the bolt or rod on which the nuts are to be assembled. The two nuts, prior to assembly with the bolt or threaded shaft, are threaded together with a spring or spring washer compressed between them.

DESCRIPTION OF PRIOR ART

Many different techniques have been devised to prevent the untimely loosening of a threaded bolt or nut after it has been installed. One example of this is the cotter pin type nut retainer on vehicle wheel assemblies. The installation requires a special castle nut and a hole drilled through the axle where it is to be installed. Finding the location where the cotter pin must be installed can prove to be very costly. Another type locknut assembly is that of the nut with a keyway machined into the nut and a machined keyway milled into the thread shaft on which the nut is to be installed. The machining for this setup is also quite costly The prevailing torque type locknut is an example of built in function that can dissipate with time. High quality prevailing torque nuts capable of being assembled and disassembled on its mating structure must retain their gripping frictional power which is built in at manufacture of the nut. Once this function has weakened the nut is no longer of value Another modern example of a lock nut device is the double locking nut. Two nuts are provided with the same thread as the bolt or shaft however each nut is of a different pitch. Once the first nut is installed and tightened the second nut is then rotated against the first nut and then tightened. This produces a clamping action between the two nuts and the shaft threads which prevents rotation of either nut.

Another type lock nut device is the opposing thread assembly. An example of this type is shown in U.S. Pat. No. 4,909,689 invented by Minoru Komatsu of Japan (1990). This device is a double nut with opposing threads. The first nut is a flanged conical shaped nut with conical portion above the flange. The nut is threaded through the center with female threads. The outer conical form above the flange is threaded with male threads. The entire nut is slit through the flange and the conical form to make the nut diametrically contractible. At assembly a nut compatible with the male threads of the conical form is threaded on, and tightened which produces a clamping action on the bolt or shaft The General Fastener Theory states no matter what type fastener is used in a given application, all fasteners perform generally the same purpose fasteners join or clamp two or more pieces of material together. Some fasteners fasten the same type of materials and others can be used on a wide variety of materials. Just as all fasteners have the same general goal, they all face the same general concerns. In choosing the fastener that is most suited for a given application, several things must be taken into account. When choosing the appropriate fastener, factors such as economics and availability play as important a role as strength and durability.

SUMMARY OF INVENTION

A thread locking device assembly consisting of four components a first shaft, with standard threads, two nuts; (one inner nut and one outer nut) both with mating female threads to standard threads of shaft. Also inner nut to have a male shaft with opposite hand threads, opposite hand to first shaft threads, which is to mate with female threads of outer nut. Before assembly of the two nuts onto the first shaft a compression spring or spring washer is inserted between these two nuts. The resistance is achieved by the use and placement of opposite hand threads with differing threads per inch or predetermined clearance and allowance between mating female and male threads. And also the containment of a spring force generated by the compression of a spring(s) or spring lock washer(s). This bolt and nut assembly by its unique construction, combines and improves the aspects of the bolt, nut and spring lock washer assembly. This invention, a bolt and nut locking device with captured spring lock washer(s) or compression spring(s) and the use of opposite hand threads that function as a friction locking mechanism. This assembly is designed so as to counter the loosing effects of any resultant rotational vibrations produced by external forces. The outer nut and inner nut matching threads are axially aligned and the two are rotated in a opposite direction to each other in order to engage threads, which compresses the captured spring(s) or spring lock washer(s). This preloaded, three part assembly with matching inner female threads axially aligned to each other is then rotated onto the threaded rod or bolt with matching male threads. Once in place the bolt and nut are rotated in the opposite direction from each other, which transfers the preload to the male threaded rod (or bolt) threads. Because of the opposite hand of the threaded shaft they can only rotate to the resisting force of the opposite hand thread interaction. The force produced by the compressed spring separating the inner nut and outer nut is now transferred from between these two parts to include the male threaded rod. The spring force is now pushing the matching common female threads in opposite directions against the male threaded shaft, bolt or pipe that joins these two parts. The assembly is now in a load condition whereas to loosen itself from the shaft threads it must tighten itself. against and overcome the spring force of the lock washer(s) or spring(s). Both the inner nut and outer nut, once rotated onto the male threaded shaft can not be rotated any farther than the clearance between them, which is provided in their manufacture. The only way these two parts, and the spring may be easily separated is if the spring is recompressed to its installation configuration only then the assembly can be rotated off of the male threaded rod with very little resistance.

This assembly has other potential uses. The above usage indicates its use as a locking nut. The assembly with minor changes can also function as a bolt and nut clamping assembly much like a standard bolt and nut assembly with a locknut included. If the male threaded rod bolt is replaced with a threaded tube it becomes a bulkhead fitting or grommet for through access. Another possible use is that of a shaft support. The shaft end would be threaded as was the threaded rod. Once in place the shaft could be rotated to the desired location and then locked in place.

Another and possibly more relevant fact is that all of the parts if not off the shelf can be made using preexisting technology. That is to say the parts can be made with standard fastener manufacturing technology.

Another factor that is important is the fact that to renew the gripping force of the nut to its initial value, simply replace the spring lock washer with a new, unused one.

BRIEF DESCRIPTION OF THE DRAWING

FIG. 1 is an elevation view of a preferred embodiment of the present invention shown with spring compressed and the two innermost female threads aligned ready for installation.

FIG. 2 is a view oft of FIG. 1 installed on a bolt thread with the spring force has been partially released and the assembly is in a locked condition.

FIG. 3 shows an enlarged view of the thread engagement when the spring lock washer has been compressed and the assembly is in a unlocked condition ready to install.

FIG. 4 shows an enlarged view of the thread engagement when the spring lock washer has been partially released. The assembly is in a locked condition.

FIG. 5 is an elevation view of another embodiment of the present invention with a modified version functioning as a bulkhead fitting.

FIG. 5a is an end view of the fitting of FIG. 5.

DETAILED DESCRIPTION OF THE PREFERRED EMBODIMENT(S)

Figures 6, 6A:
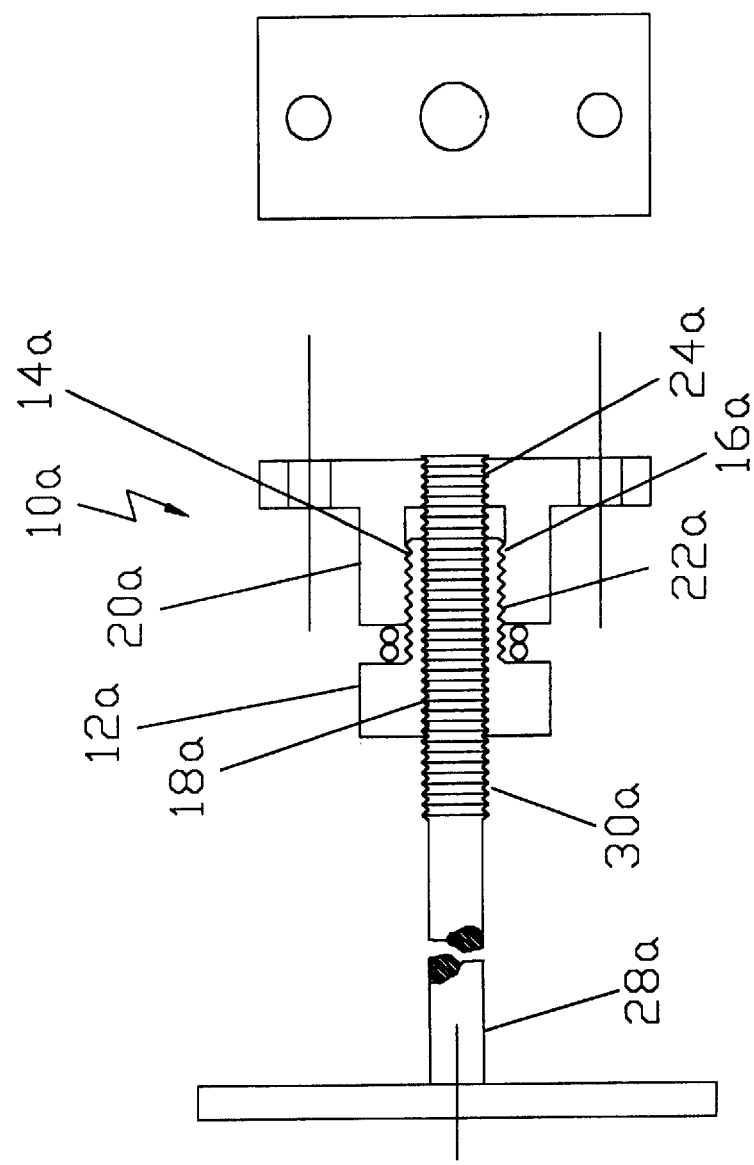
FIG. 6 is a elevation view an another embodiment of the present invention with a modified version functioning as a shaft support
FIG. 6a is an end view of the support shown in FIG. 6.

Referring to FIGS. 1–4 A bolt and nut friction locking assembly 10. In accordance with the present invention includes four components. A nut 12, a nut 20, a spring 26 and a threaded bolt 28. The nut 12 preferably has a hex head, however it can be any appropriate shape. The shaft 14 of nut 12 is to be threaded with a male thread 16 through the center of the shaft a female thread of opposite hand threads 18 is machined. All of the threads are to be concentric with each other. The nut 20 is to have a female thread 22 part way through itself which is to be threadable with male thread 16. The clearance between male thread 16 and female thread 22 to be determined. when they are manufactured. At the opposite end of nut 20 a second smaller diameter female thread 24 concentric with thread 22 is installed the remaining distance through the nut 20. The thread 24 is identical to thread 18 of nut 12. When manufactured these two threads are to be constructed so that when assembled, with the captured spring washer 26 compressed, they can be threaded onto bolt 28 with threads 30.

The operation of the present invention will be discussed in reference to FIGS. 1–4. Prior to assembly with the threaded bolt 28, the nut 12 is preassembled to nut 20 with spring washer 26 captured between the two. The nut 20 and nut 12 are rotated with respect to each other such that the spring washer is compressed to a predetermined distance. This is the point at which the inner female threads 18 of nut 12 are aligned with the inner female threads 24 of nut 20. The nut assembly is now ready to be rotated onto bolt 28 with threads 30. Once the location for the nut assembly on the bolt threads is determined, the nut 20 and the nut 12 are counter rotated until they can no longer be turned. At this point most of the force of the compressed spring washer has been transferred from the two nut assembly to include the bolt male threads 30. To remove the two nut assembly, rotate either so that the spring is recompressed to its initial condition.

Referring to FIG. 5 An alternate embodiment to the present invention. A pipe and nut friction locking assembly 11. modified so as to function as a bulkhead fitting or as grommet. In accordance with the present invention, the bulkhead fitting includes four components: a partially threaded nut 13, a nut 21, a spring 27 and an externally threaded pipe 29. The nut 13 preferably with a hex head, however it can be any appropriate shape. The shaft 15 of nut 13 to be threaded with a male thread 17. Through the center of the shaft 15 a female thread of opposite hand to male threads 17 of shaft 15 threads 19 is installed. All of the threads are to be concentric with each other. The second component, a nut 21 preferably with a hex shape, however can be any appropriate shape. The nut 21 is to have a female thread 23 part way through itself which is to be threadable with male thread 17. The clearance between male thread 17 and female thread 23 to be determined when they are manufactured. At the opposite end of nut 21 a second smaller diameter female thread 25 concentric with thread 23 is installed the remaining distance through the nut 21. The thread 25 is identical to female thread 19 of nut 13. When manufactured these two threads are to be constructed so that when assembled, with the captured spring washer 27 compressed, they can be threaded onto a threaded pipe 29 with threads. 31.

The operation of the present invention will be discussed in reference to FIG. 5 Prior to assemble with the externally threaded pipe 29. The nut 13 is preassembled through the existing hole in the wall to nut 21 with spring washer 27 captured between the two. The nut 21 and nut 13 are rotated with respect to each other such that the spring washer is compressed to a predetermined distance. This is the point at which the inner female threads 19 of nut 13 are aligned with the inner female threads 25 of nut 21. The bolt and nut assembly is now ready for the threaded pipe 29 to be installed. Once the location for the threaded pipe is determined, the nut 21 and the nut 13 are counter rotated until they can no longer be turned. At this point the force of the compressed spring washer has been transferred from the nut and bolt to include the threaded pipe 29 with threads 31. To remove the two nut assembly from the shaft rotate either nut so that the spring is recompressed to its initial condition Referring to FIG. 6 A bolt and nut friction locking assembly 10a modified to function as a shaft support. In accordance with the present invention, the shaft support includes four components: a nut 12a, a nut 20a, a spring 26a and a threaded shaft 28a. The nut 12a preferably has a hex head, however it can be any appropriate shape. The shaft 14a of nut 12a to be threaded with a male thread 16a. Through the center of the shaft a female thread of opposite hand threads 18a is installed. All of the threads are to be concentric with each other. The second component, a nut 20a preferably with a hex shape, however can be any appropriate shape. The nut 20a is to have a female thread 22a part way through itself which is to be threadable with male thread 16a. The clearance between male thread 16a and female thread 22a to be determined when they are manufactured. At the opposite end of nut 20a a second smaller diameter female thread 24a concentric with thread 22a is installed the remaining distance through the nut 20a. The thread 24a is identical to thread 18a of nut 12a. When manufactured these two threads are to be constructed so that when assembled with the captured spring washer 26a compressed, they can be threaded onto a male shaft 28a with threads 30a.

The operation of the present invention will be discussed in reference to FIG. 6. Prior to assembly with the threaded shaft 28a, the nut 12a is preassembled to nut 20a with spring washer 26a captured between the two. The nut 20a and nut 12a are rotated with respect to each other such that the spring washer is compressed to a predetermined distance. This is the point at which the inner female threads 18a of nut 12a are aligned with the inner female threads 24a of nut 20a. The bolt and nut assembly is now ready to be rotated onto the shaft 28a with threads 30a. Once the location for the bolt and nut assembly on the rod or bolt threads is determined, the nut 20a and the nut 12a are counter rotated until they can no longer be turned. At this point the force of the compressed spring washer has been transferred from the nut 12a and nut 20a to include the threaded shaft threads 30a. To remove the nut and bolt assembly, rotate each so that the spring is recompressed to its initial condition While this invention has been described in terms of a few preferred embodiments, it is contemplated that persons reading the preceeding descriptions and studying the drawings will realize various alterations, permutations and modifications thereof. It is therefore intended that the following appended claims be interpreted as including all such alterations, permutations and modification as fall within the true spirit and scope of the present invention.

What is claimed is:

1. A locking nut assembly comprising:

a first nut having an opening therethrough, the opening having first female threads therein adapted for threading engagement with a male threaded member, the first nut having a first outer portion of a given diameter and a second outer portion of reduced diameter relative to the first diameter portion of the first nut, the reduced diameter portion having first male threads thereon, the first male threads being substantially concentric with the first female threads and opposite-handed relative to the first female threads, and;

a second nut having an opening therethrough, the opening having a first inner portion of a given diameter, the first inner portion having first female threads therein also adapted for threading engagement with the male threaded member such that the first female threads of the second nut are of similar diameter and the same-handedness as the first female threads of the first nut, the second nut having a second inner portion of a larger diameter relative to the first inner portion, the second inner portion having second female threads of similar diameter and same-handedness as the first male threads of the first nut such that the first male threads of the first nut can be threadedly engaged and assembled with the second female threads of the second nut, the first and second female threads of the second nut being substantially concentric with each other, and;

a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a vibration-resistant connection.

2. A locking nut assembly comprising:

a male threaded member, and;

a first nut having an opening therethrough, the opening having first female threads therein for threading engagement with the male threaded member, the first nut having a first outer portion of a given diameter, and a second outer portion of reduced diameter relative to the first diameter portion of the first nut, the reduced diameter portion having first male threads thereon, the first male threads being substantially concentric with the first female threads and opposite-handed relative to the first female threads and;

a second nut having an opening therethrough, the opening having a first inner portion of a given diameter, the first inner portion having first female threads for threading engagement with the male threaded member such that the first female threads of the second nut are of similar diameter and the same-handedness as the first female threads of the first nut, the second nut having a second inner portion of a larger diameter relative to the first inner portion, the second inner portion having second female threads of similar diameter and same-handedness as the first male threads of the first nut such that the first male threads of the first nut can be threadedly engaged and assembled with the second female threads of the second nut, the first and second female threads of the second nut being substantially concentric with each other, and;

a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a vibration-resistant connection.

3. The locking nut assembly of claim 2 wherein the male threaded member has a concentric opening therethrough defining a pipe such that the locking nut assembly can be used as a bulkhead fitting.

4. The locking nut assembly of claim 2, wherein the second nut has a mounting flange portion of larger dimension than the first and second diameter portions for mounting the assembly.

* * * * *